June 2, 1942. A. P. STEWART 2,284,929
METHOD OF MAKING A DIE SPOTTING DEVICE
Filed Oct. 2, 1940 2 Sheets-Sheet 1
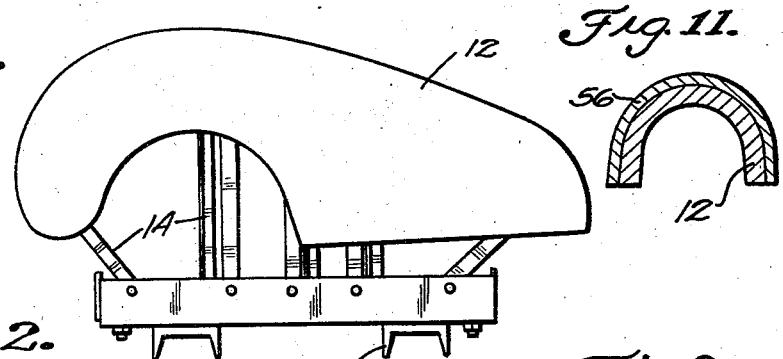
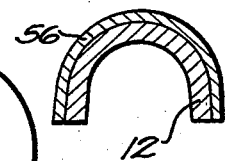
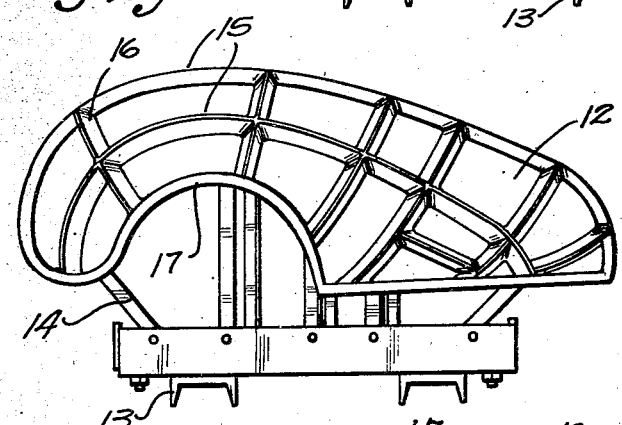
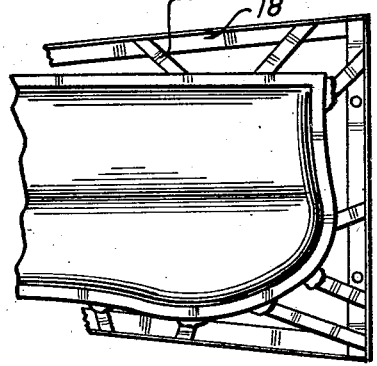
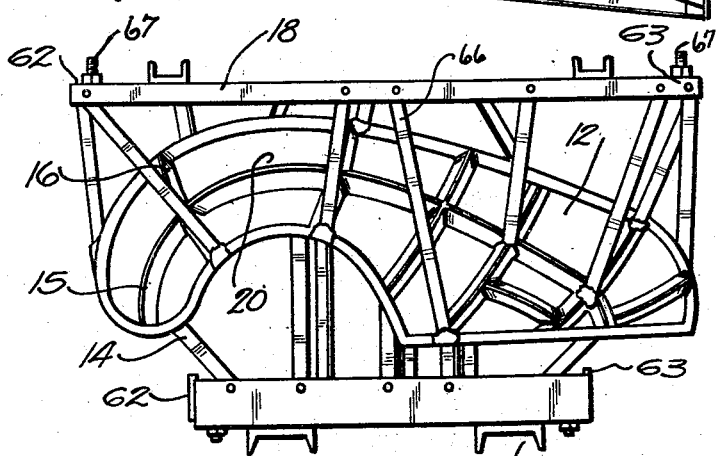
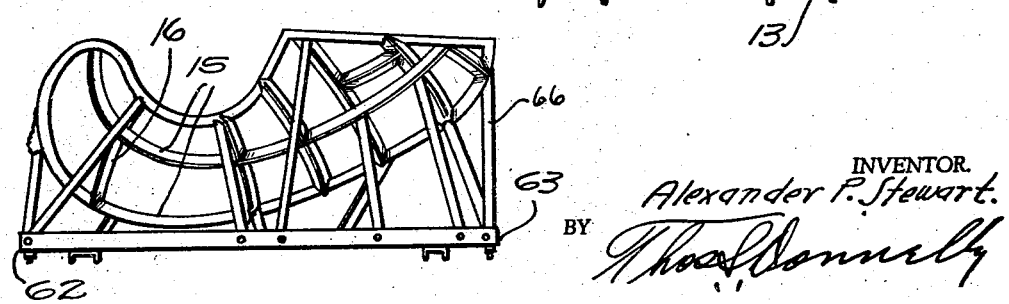
INVENTOR.
Alexander P. Stewart.
BY Thos. Donnelly June 2, 1942.  A. P. STEWART  2,284,929
METHOD OF MAKING A DIE SPOTTING DEVICE
Filed Oct. 2, 1940  2 Sheets-Sheet 2
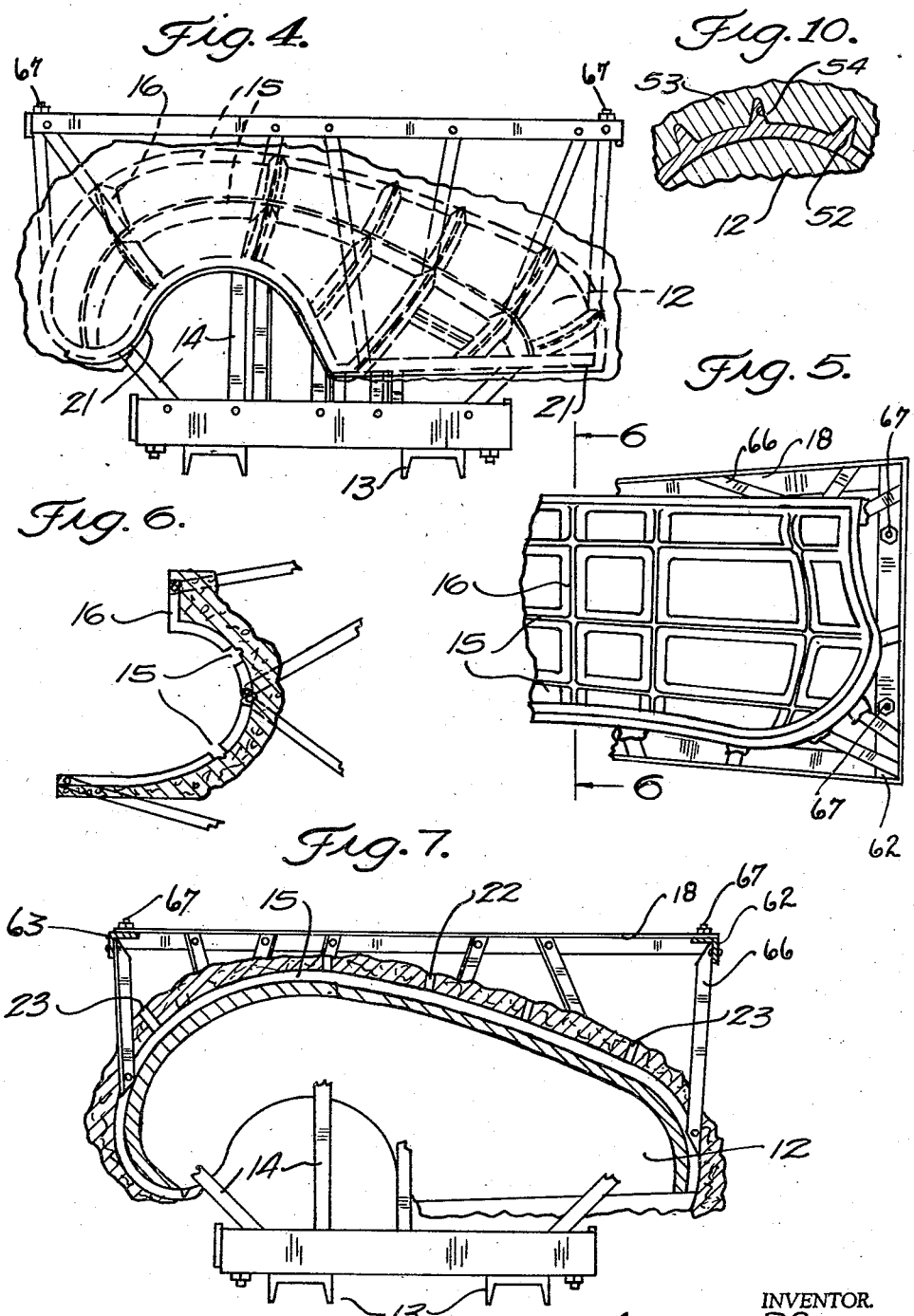
INVENTOR.
ALEXANDER P. STEWART
BY Thos. Donnelly Patented June 2, 1942

2,284,929

UNITED STATES PATENT OFFICE 2,284,929

METHOD OF MAKING DIE SPOTTING DEVICES

Alexander P. Stewart, Detroit, Mich.

Application October 2, 1940, Serial No. 359,413

8 Claims. (Cl. 22—158)

My invention relates to a new and useful improvement in the method of making a die spotting device. The structure to be made is used for spotting dies and the like in order to determine whether or not there are any low spots or high spots on the die so that further operations may be properly located. In fabricating dies it is customary to work from a pattern and the efforts of the die maker are directed to reproducing, generally in metal, the pattern from which the work is made. As the work proceeds it is checked by the die maker so that high spots or low spots may be removed and the working face of the die made to conform accurately to the form of the pattern from which it is made. In order to accurately test the work being done in the fabrication of the die a complementary part is provided having an engaging surface corresponding to the surface desired to be produced on the die. If a male die is being made, the pattern is used for forming a complementary female reproduction of the male pattern and this female reproduction is then used as the testing or spotting structure so that if the spotting structure is provided with the female cavity conforming to pattern and this cavity accurately and snugly fits the male pattern from which the die is being made, a deposit of the cavity over the die will indicate inaccuracies in the die structure. Similarly, if a female die is being fabricated, a male duplicate of the model must be constructed.

It is an object of the present invention to provide a means for fabricating a testing structure of this type whereby accuracy, compactness and durability of the die spotting device may be effected.

It is another object of the present invention to provide a method of constructing a die spotting device so that the contacting faces of the spotting structure will define a surface exactly duplicating the surface of the pattern in accordance with which the die is being made.

Another object of the invention is the provision of methods whereby a spotting device of this type may be provided constructed from a network, the engaging faces of which will accurately define the surface of the pattern.

Another object of the invention is the provision of the method of fabricating a die spotting device of this type which may be easily and quickly carried on at a minimum expense.

Another object of the invention is the provision of a method of making a die spotting structure so that the angular position of the pattern relative to its support may be duplicated in the angular position of the spotting device relative to its support. Other objects will appear hereinafter. It is recognized that various changes, modifications and departures herein set out, may be resorted to without departing from the spirit of the invention and it is intended that such variations, modifications and departures may be brought within the scope hereof.

Another object of the invention is the provision of an all-metal device embodying a spotting or contact face or area and a steel frame united together as a single composite unit.

Another object of the invention is the provision of a spotting device of this class, in which changes of atmospheric conditions will have a minimum effect.

For the purposes of illustration, drawings are presented in which:

Fig. 1 is a side elevational view of a pattern.

Fig. 2 is a side elevational view of the pattern showing one of the steps of fabrication.

Fig. 3 is a side elevational view showing the next successive step in fabrication.

Fig. 4 is a side elevational view showing the next successive step in fabrication.

Fig. 5 is a fragmentary top plan view showing a further step in the fabrication.

Fig. 6 is a fragmentary sectional view taken on line 6—6 of Fig. 5.

Fig. 7 is a longitudinal sectional view showing the next successive step in the manufacture.

Fig. 8 is a side elevational view slightly reduced of the finished product.

Fig. 9 is a fragmentary top plan view of a modified form of the invention.

Fig. 10 is a fragmentary sectional view of a modified form of the invention.

Fig. 11 is a cross sectional view showing a further modification of the invention.

In carrying on the method of manufacture a pattern 12 is used. This is the pattern in accordance with which it is desired to form the die. In the drawings I have shown this pattern provided with a supporting base 13 connected thereto by legs 14. This method of attaching the base to the pattern is merely for the purposes of illustration as the supporting base may be attached thereto in any desired manner. The base 13, however, is mounted on the pattern 12 at a certain angularity relatively thereto depending upon the purposes to which the die formed therefrom is to be put and the uses to which the finished product is to be adapted. In this method of manufacture the structure is of a web-like nature and I mount on the working face or surface of the pattern 12, longitudinally extending ribs 15, transversely extending rib 16, and a defining or edge forming frame 17. These ribs and frame are formed from a workable plastic material such as clay or the like. In carrying out the process I prefer to use clay. These ribs are pressed firmly against the working face of the pattern 12. A base 18 with the attaching legs are located as shown in Fig. 3 with the one end of the legs 66 imbedded in either the ribs or the edge forming frame of clay, each of the legs having openings formed in its embedded end. These legs 66 are mounted in position so that the frame 18 bears the same angular relation to the working face of the pattern as does the frame 13, and in order to accomplish this it is preferable, and generally necessary, that the frame 18 extend parallel to the frame 13. When the frame and the legs are mounted in the position shown in Fig. 3, the entire surface of the pattern 12, as well as the ribs and the edge forming frame, are covered with a plastic material such as plaster or the like. The plaster thus applied becomes a single unit together with clay ribs and frame and the mask so formed is removable as one piece. In this operation the plaster will, of course, fill the cavities or spaces 20 between the ribs and between the ribs and the edge forming frame 17. In order to form a stop for the plaster I mount, as shown in Fig. 4, a ledge forming plate 21 of cardboard or similar material on the pattern 12. When the plaster has firmly set, the mask, thus formed, is removed from the pattern 12 and placed in inverted position with the frame 18 serving as the support. The clay or other suitable material from which the ribs 15 and 16 and the edge forming frame 17 were formed are then removed by being gouged out so that the mask is then provided, on its face, with a plurality of grooves as shown in Fig. 6. The mask is then returned into position on the pattern 12 and, through a suitable sprue or pouring passage 22 I pour a molten or substantially liquid product, suitable air vents 23 having been formed through the plaster to communicate with the various grooves. Available on the market is a metal alloy which has proven most satisfactory for this purpose inasmuch as it is quite flowable and melts at a very low temperature and will not harm a wood pattern. When this pouring operation is completed the poured material is permitted to harden and there is provided a frame of the poured material corresponding to the original structure defined by the clay ribs shown in Fig. 2. The plaster is then broken away leaving a web-like structure such as shown in Fig. 8 and the inner faces of these ribs and of the edge forming frame will define an area exactly duplicating the working face of the pattern so that there is thus provided a spotting device which may be fitted to the die. The removal of the hardened plaster is facilitated by forming the ribs with inclined side walls, these ribs being illustrated as wedge-shaped in cross section, tapering to the outer edge. When the die is so constructed that it will accurately fit over the male die structure, the pattern originally used will have been duplicated in the material from which the die is being made. The plaster which is deposited in the spaces 20 engages snugly against the face of the pattern and prevents leakage of the liquid material from ore groove to another so that an accurate and easily constructed device is provided.

As shown in Fig. 9, if desired the laying of the ribs and edge forming frame illustrated in Fig. 2 may be dispensed with, in which case the face of the pattern covered with plaster and the supporting frame enters therein. The mask thus formed may be removed and the necessary grooves for ribs and frame formed in the face of the plaster mask by scaring, gouging or in any other manner.

In Fig. 10 I have shown a further modified form of the invention in which the templet body 12 is covered with a layer of clay on the side having the outstanding ribs 52 also formed of clay projecting outwardly from the outer surface. This body is covered by the layer 53 of plaster so that when the plaster is hardened the clay may be removed, thus making it possible to provide a spotting mask consisting of a thin shell with the outstanding ribs 54.

In Fig. 11 I have shown the body 12 provided with a rib 56 extending crosswise thereof, this rib being formed from metal in the manner already indicated. In this manner there is provided an easy and quick method of forming a cross section of the pattern, the rib when viewed from the side, outlining the contour of the pattern in cross section.

In the drawings I have illustrated the cross members 62 and 63 as being provided with bolts 67. One of these cross members as shown, is provided with a pair of bolts 67 and the other with a single bolt 67 so that when the structure is set in the position shown in Fig. 8 a three-point bearing on the supporting surface is afforded, thus preventing undue strains and stresses which would result in warping.

What I claim as new is:

1. The method of making a die spotting device corresponding to a pattern consisting in mounting on the contact surface of the pattern a plurality of ribs in spaced relation to each other, covering said ribs and filling the spaces between the same with a hardening material while in softened condition to provide a mask over said pattern, removing said ribs from the mask to provide channels on the face thereof and pouring into said channels while said mask is positioned on the pattern, a hardening material in softened condition.

2. The method of making a die spotting device conforming to a pattern consisting in placing spaced apart ribs on the surface of the pattern in engagement therewith, covering said ribs and filling the space between the same with a hardening material in softened condition, removing the rib-forming material upon the hardening of said hardening material to provide a mask for said pattern having grooves on its face, placing said mask on said pattern and while in position thereon, delivering to said grooves a sufficient quantity of hardening material in softened condition for filling said grooves and then allowing said groove-filling material to harden.

3. The method of making a die spotting device conforming to a pattern consisting in placing spaced apart ribs on the surface of the pattern in engagement therewith, covering said ribs and filling the space between the same with a hardening material in softened condition, removing the rib-forming material upon the hardening of said hardening material to provide a mask for said pattern having grooves on its face, placing said mask on said pattern and while in position thereon, delivering to said grooves a sufficient quantity of hardening material in softened condition for filling said grooves and then allowing said groove-filling material to harden to provide hardened ribs and then removing from said hardened ribs the hardening material covering said ribs and filling the space between the same.

4. The method of forming a die spotting device in conformance with a pattern mounted on a stationary base consisting in placing on the contact surface of the pattern a plurality of spaced apart ribs, covering said ribs and filling the space between the same with a hardening material in softened condition, removing said rib-forming material from said hardening material after the same has hardened to provide a mask for said pattern having grooves on one face thereof, placing said mask on said pattern and while in position thereon, delivering into said grooves, in softened condition, a hardening material.

5. The method of making a die spotting device in conformance with a pattern mounted on a support consisting in placing upon one face of said pattern, spaced apart ribs, securing at one of their ends a plurality of supporting legs in said ribs and projecting the same outwardly therefrom, covering said ribs and filling the space between the same with a hardening material in softened condition and permitting said hardening material to harden, removing said rib forming material to provide a mask having grooves on one of its faces with the ends of the legs projecting into said grooves and placing said mask on said pattern and filling said grooves with a hardening material while in softened condition and permitting the same to harden.

6. The method of making a die spotting device in conformance with a pattern mounted on a support consisting in placing upon one face of said pattern, spaced apart ribs, securing at one of their ends a plurality of supporting legs in said ribs and projecting the same outwardly therefrom, covering said ribs and filling the space between the same with a hardening material in softened condition and permitting said hardening material to harden, removing said rib forming material to provide a mask having grooves on one of its faces with the ends of the legs projecting into said grooves and placing said mask on said pattern and filling said grooves with a hardening material while in softened condition and permitting the same to harden and then removing the first-named hardening material.

7. The method of making a die spotting device on conformance with a pattern mounted on a support consisting in placing upon one face of said pattern, spaced apart ribs, securing at one of their ends a plurality of supporting legs in said ribs and projecting the same outwardly therefrom, covering said ribs and filling the space between the same with a hardening material in softened condition and permitting said hardening material to harden, removing said rib forming material to provide a mask having grooves on one of its faces with the ends of the legs projecting into said grooves and placing said mask on said pattern and filling said grooves with a hardening material while in softened condition and permitting the same to harden and then removing the first-named hardening material, and then securing on said supporting legs a supporting member in predetermined angulation to the supporting member of said pattern.

8. The method of making a die spotting device corresponding to a pattern consisting in mounting on the contact surface of the pattern, a rib-forming member, covering said rib-forming member and a portion of the contact surface of said pattern with a hardening material while in softened condition to provide a mask over said portion of said pattern, removing said rib from the mask to provide a channel on the face thereof and pouring into said channel, while said mask is positioned on the pattern, a hardened material in softened condition.

ALEXANDER P. STEWART.